United States Patent [19]

Krumpelt et al.

[11] Patent Number: 5,232,794
[45] Date of Patent: Aug. 3, 1993

[54] IONIC CONDUCTORS FOR SOLID OXIDE FUEL CELLS

[75] Inventors: Michael Krumpelt, Naperville; Ira D. Bloom, Bolingbrook; Jose D. Pullockaran, Hanover Park; Kevin M. Myles, Downers Grove, all of Ill.

[73] Assignee: The United States of America as represented by the United States Department of Energy, Washington, D.C.

[21] Appl. No.: 777,955

[22] Filed: Oct. 17, 1991

[51] Int. Cl.⁵ .............................................. H01M 8/10
[52] U.S. Cl. ........................................ 429/30; 429/33
[58] Field of Search ......................... 429/33, 30, 191; 204/421

[56] References Cited

U.S. PATENT DOCUMENTS

| | | | |
|---|---|---|---|
| 3,300,344 | 1/1967 | Bray et al. | 429/33 |
| 4,462,891 | 7/1984 | Lawless | 204/421 X |
| 4,476,196 | 10/1984 | Poeppel et al. | |
| 4,476,197 | 10/1984 | Herceg | |
| 4,476,198 | 10/1984 | Ackerman et al. | |
| 4,477,541 | 10/1984 | Fraioli | 429/33 |
| 4,686,158 | 8/1987 | Nishi et al. | 429/31 X |
| 4,702,971 | 10/1987 | Isenberg | 429/31 X |
| 4,985,315 | 1/1991 | Lemoine | 429/33 |

Primary Examiner—Anthony Skapars
Attorney, Agent, or Firm—Hugh W. Glenn; Robert J. Fisher; William R. Moser

[57] ABSTRACT

An electrolyte that operates at temperatures ranging from 600° C. to 800° C. is provided. The electrolyte conducts charge ionically as well as electronically. The ionic conductors include molecular framework structures having planes or channels large enough to transport oxides or hydrated protons and having net-positive or net-negative charges. Representative molecular framework structures include substituted aluminum phosphates, orthosilicates, silicoaluminates, cordierites, apatites, sodalites, and hollandites.

18 Claims, 9 Drawing Sheets

IONIC CONDUCTORS FOR SOLID OXIDE FUEL CELLS

CONTRACTUAL ORIGIN OF THE INVENTION

The United States has rights in this invention pursuant to contract No. W-31-109-ENG-38 between the United States Government and Argonne National Laboratory.

BACKGROUND OF THE INVENTION

1. Field of the Invention

This invention relates to high-temperature ionic conductors for solid oxide fuel cells and more particularly to a class of ionic conductors stable at temperatures in the order of 600°-800° C. and which are based on framework structures with net positive or negative charges along channels, tunnels or planes that are large enough to transport an oxide ion or a hydrated proton.

2. Background of the Invention

Solid oxide fuel cells (SOFC's) can become one of the most durable and economical fuel systems for utility and transportation applications. Using solid electrolytes virtually eliminates corrosion reactions and electrolyte losses that are common in liquid electrolyte fuel cells. Furthermore, fuel processing for SOFC's is simpler and less expensive than other types of fuel cells.

Presently, SOFC's operate at temperatures of approximately 1000° C. The requirement of high-operating temperatures to attain adequate conductivity levels limits the number of materials available for SOFC fabrication as most materials become compromised thermally, chemically and mechanically under these high temperature conditions. For example, the conductivity of the commonly used yttrium-stabilized zirconium oxide is $10^{-1}$ ohm$^{-1}$ cm$^{-1}$ at 1000° C. This conductivity decreases to $4\times10^{-2}$ ohm$^{-1}$ cm$^{-1}$ at 800° C. Examples of yttria-stabilized zirconia electrolyte use at high temperatures can be found in U.S. Pat. Nos. 4,476,196; 4,476,197 and 4,476,198, wherein the electrolytes facilitate ion transfer in electrochemical fuel cells operating in temperatures exceeding 1000° C. As with the above-mentioned teachings, most fuel cells incorporating yttria-stabilized zirconia also rely on standard materials, such as zirconium-based cermet as constituents for the accompanying electrodes.

Presently known high-temperature electrolytes are oxide ion conductors that transport oxide ions by the vacancy migration mechanism. In the yttrium-stabilized zirconium oxide system, a positive charge deficiency is created by substituting some trivalent yttrium ions for the tetravalent zirconium ions in the cation sublattice. To compensate for the positive charge deficiency, oxide ion vacancies are formed in the oxide sublattice. These vacancies provide the stopping-off points for hopping oxide ions. Aside from zirconium oxide, other presently known oxide ion conductors include $CeO_2$, $ThO_2$, $HfO_2$, and $Bi_2O_3$. All of these host oxides contain various types of dopants to enhance conductivity. When these materials crystallize in the fluorite structure, oxygen ion vacancies can be found in the oxygen sublattice. These vacancies facilitate the mechanism for the hopping of oxides across the electrolyte thereby serving as the conduit for oxide ions through the electrolyte.

Operating a SOFC at more moderate temperatures, such as 600°-800° C., would allow much greater flexibility in engineering the fuel stack because metals could be used as interconnect and gasket materials. This would ultimately reduce the cost and open up new applications. With the present technology, it is not possible to lower the operating temperature of the fuel cell because the electrical resistance of the electrolyte increases exponentially as temperature decreases. To decrease the operating temperature, a new electrolyte is required.

New electrolytes have been discovered to conduct by a different mechanism; i.e. by transport of interstitial ions instead of by vacancy migration. These oxides do not crystallize in the fluorite structure. They have framework structures which feature channels or planes that are large enough to transport an oxide ion or a hydrated proton through them. By creating net positive or negative charges on the framework, interstitial oxide ions (such as $O^{2-}$) or hydrated protons (such as $H_3O^{30}$) are able to pass through the channels and/or planes at a high rate.

SUMMARY OF THE INVENTION

It is an object of the present invention to provide a class of electrolytes that overcomes many of the disadvantages of prior art arrangements.

It is another object of the present invention to provide a class of electrolytes for transporting ions for use in utility and transportation applications. A feature of the present class of electrolytes is their use at temperatures of between approximately 600°-800° C. An advantage of the present invention is the ability to now incorporate a wider range of materials in the fabrication of solid oxide fuel cells.

Still another object of the present invention is to provide a highly conductive electrolyte at temperatures below 1000° C. A feature of the invention is the incorporation of a new class of ionic conductors consisting of molecular framework structures having channels or planes large enough to accommodate rapid transport of ions. An advantage of the present invention is a high level of ion conductance at relatively low temperatures.

Yet another object of the present invention is its use as electrolytes in fuel cells, sensors or batteries. A feature of the present invention is substituting some of the atoms on the molecular framework structure of the electrolytes with relatively high- or low-valent elements to create a net positive or net negative charge on the lattice. An advantage of the present invention is the electrolyte's ability to attract and shuttle through the molecular framework structure ions such as oxides and hydrated protons.

In brief, the objects and advantages of the present invention are achieved by a solid oxide electrolyte. An ionic conductor comprising molecular framework structures having net positive or net negative charges, or oxide-ion vacancies is utilized. These structures have channels or planes running through them that are large enough to transport ions such as oxide ions or hydrated protons. These molecular framework structures can be selected from, but are not limited to, the group consisting of substituted aluminum phosphates, orthosilicates, silicoaluminates, cancrinites, cordierites, apatites, sodalites, and hollandites.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE INVENTION

Figure 1:
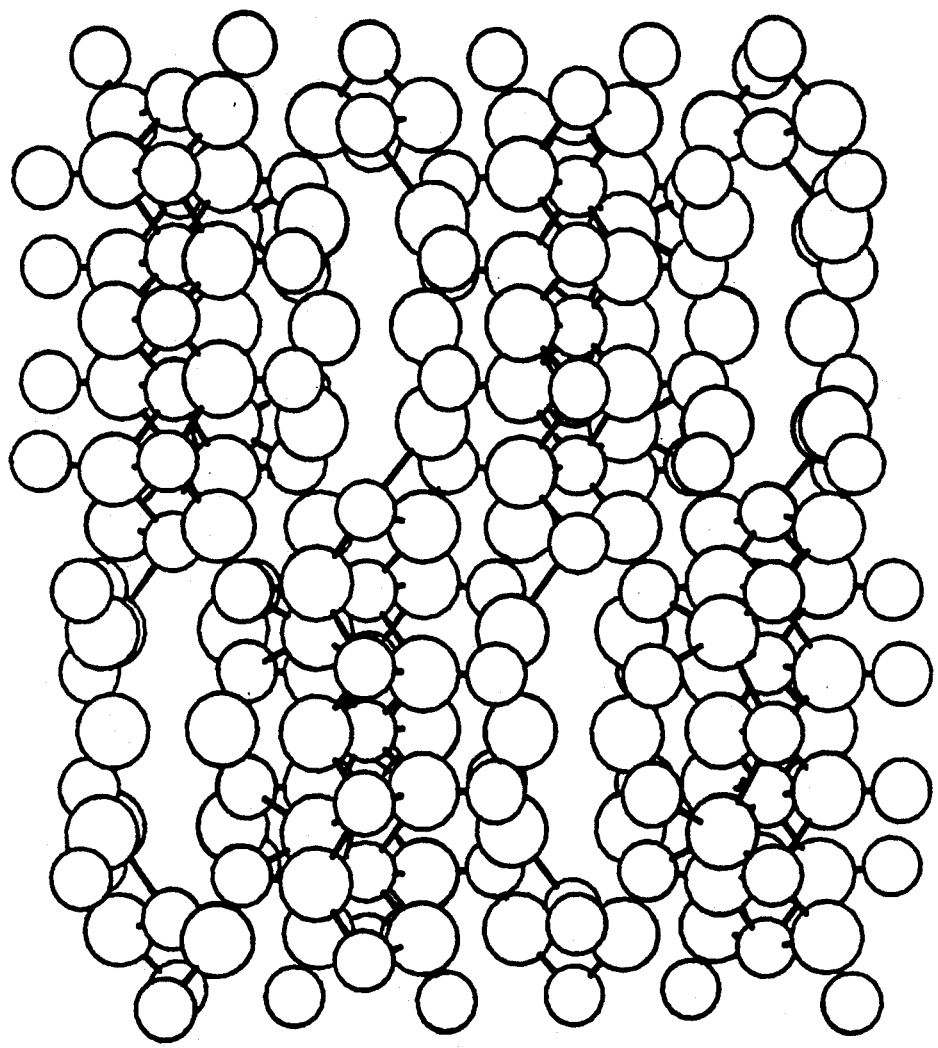
FIG. 1 is a crystal structure plot of Anthophyllite, which is a molecular framework structure utilized in the present invention.
Figure 2:
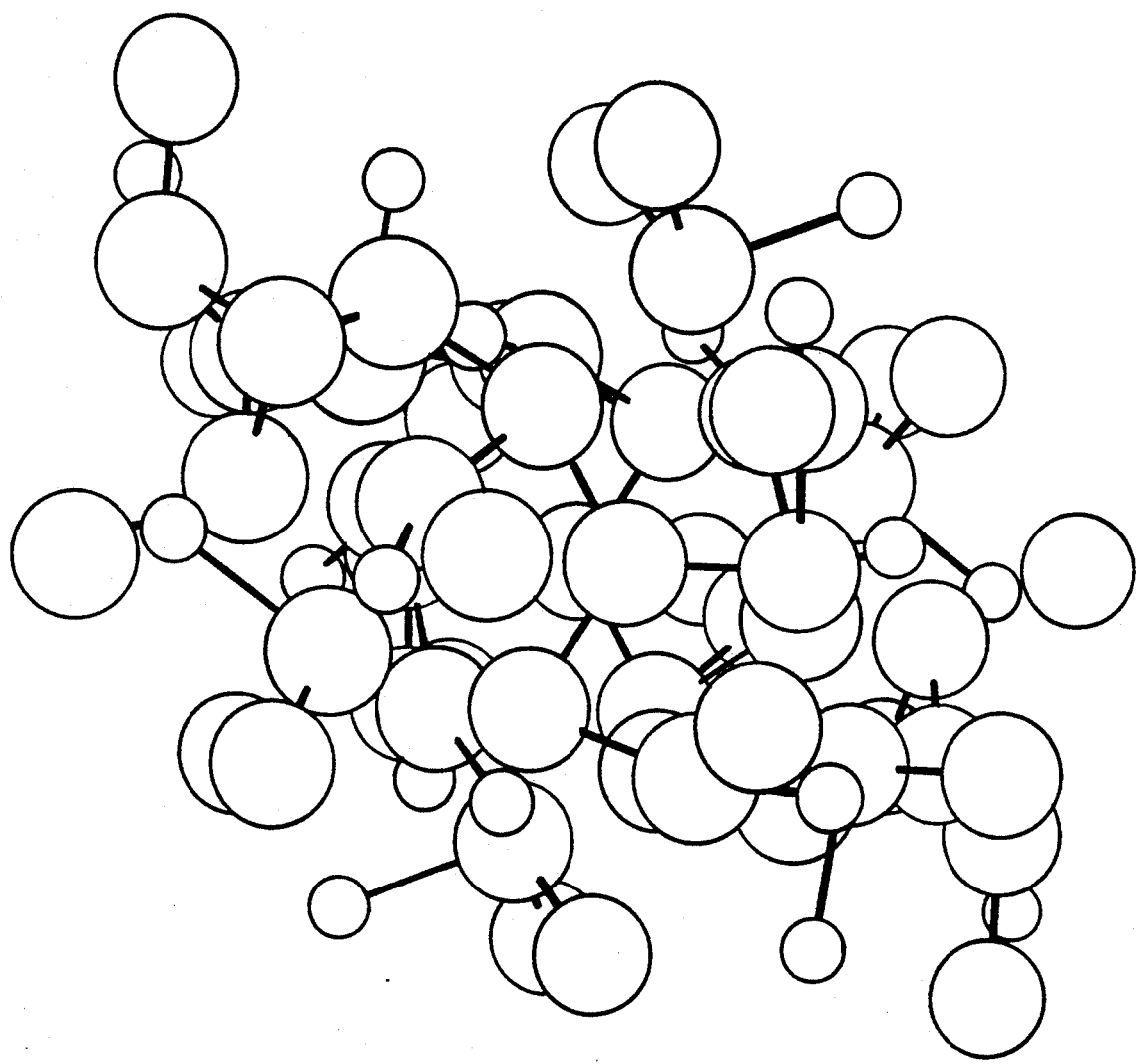
FIG. 2 is a crystal structure plot of Apatite, which is a molecular framework structure utilized in the present invention.
Figure 3:
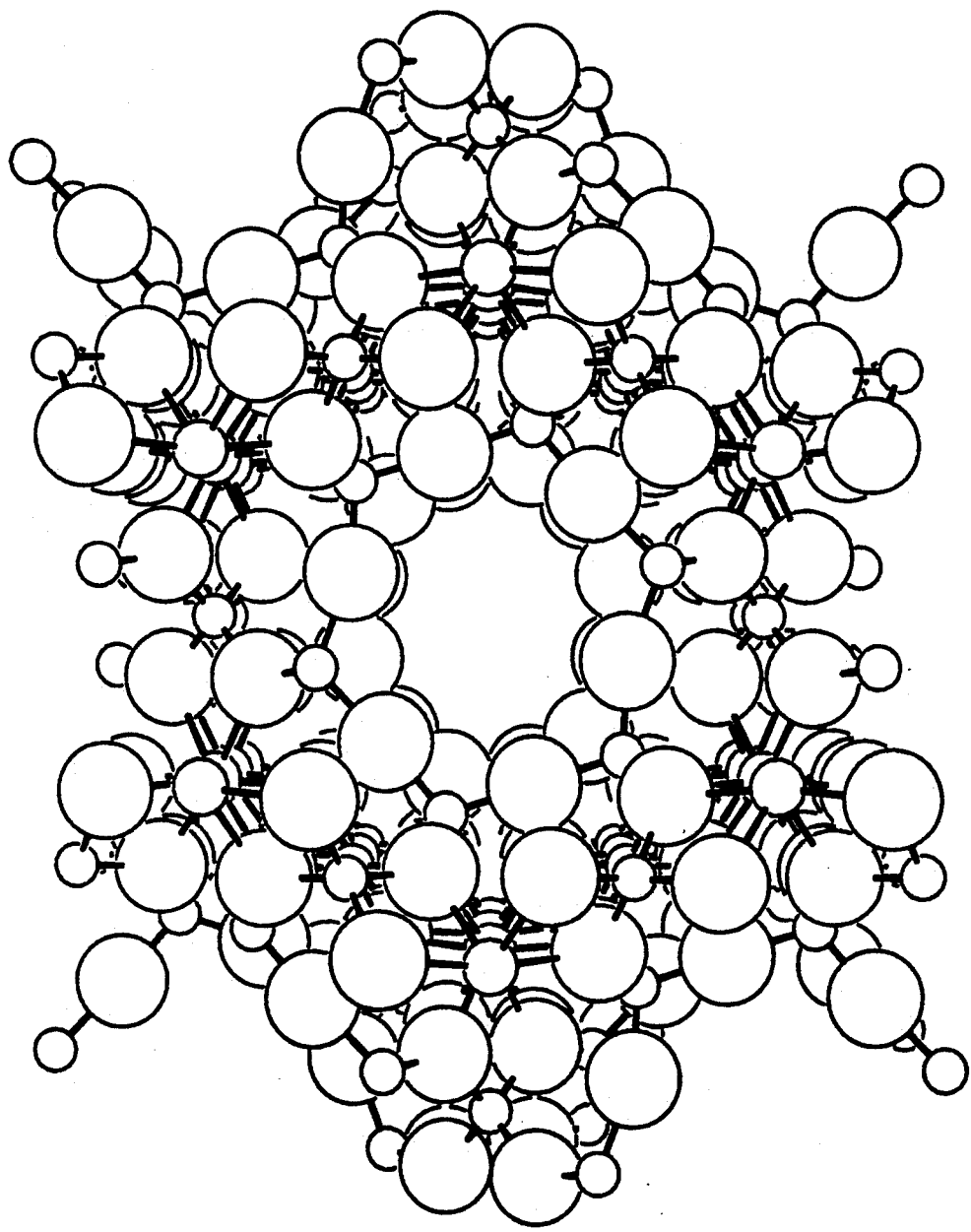
FIG. 3 is a crystal structure plot of Cordierite, which is a molecular framework structure utilized in the present invention.
Figure 4:
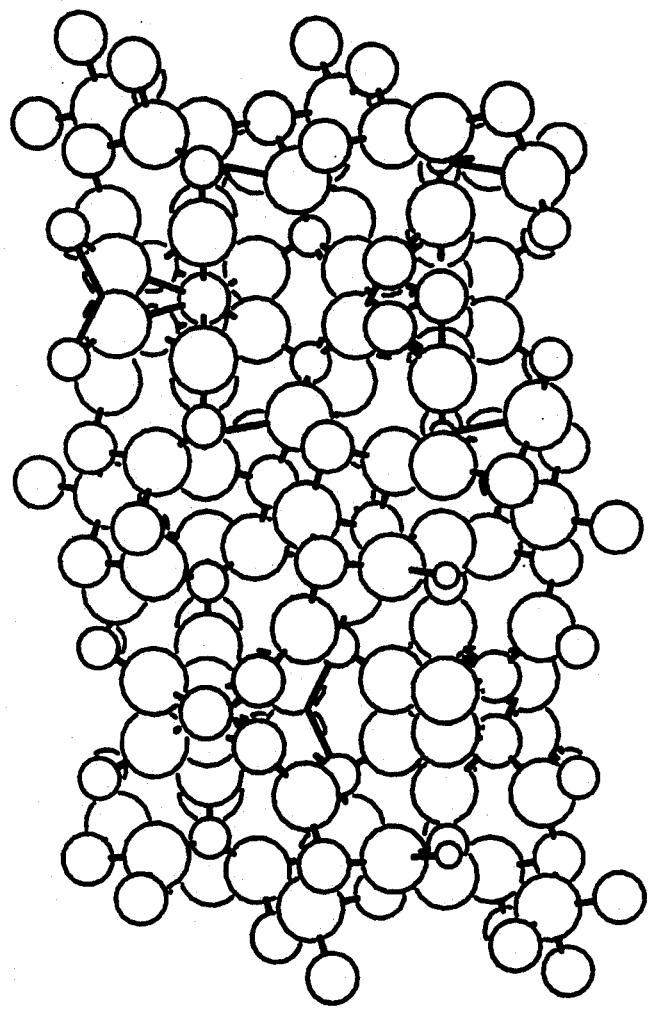
FIG. 4 is a crystal structure plot of Dumortierite, which is a molecular framework structure utilized in the present invention.
Figure 5:
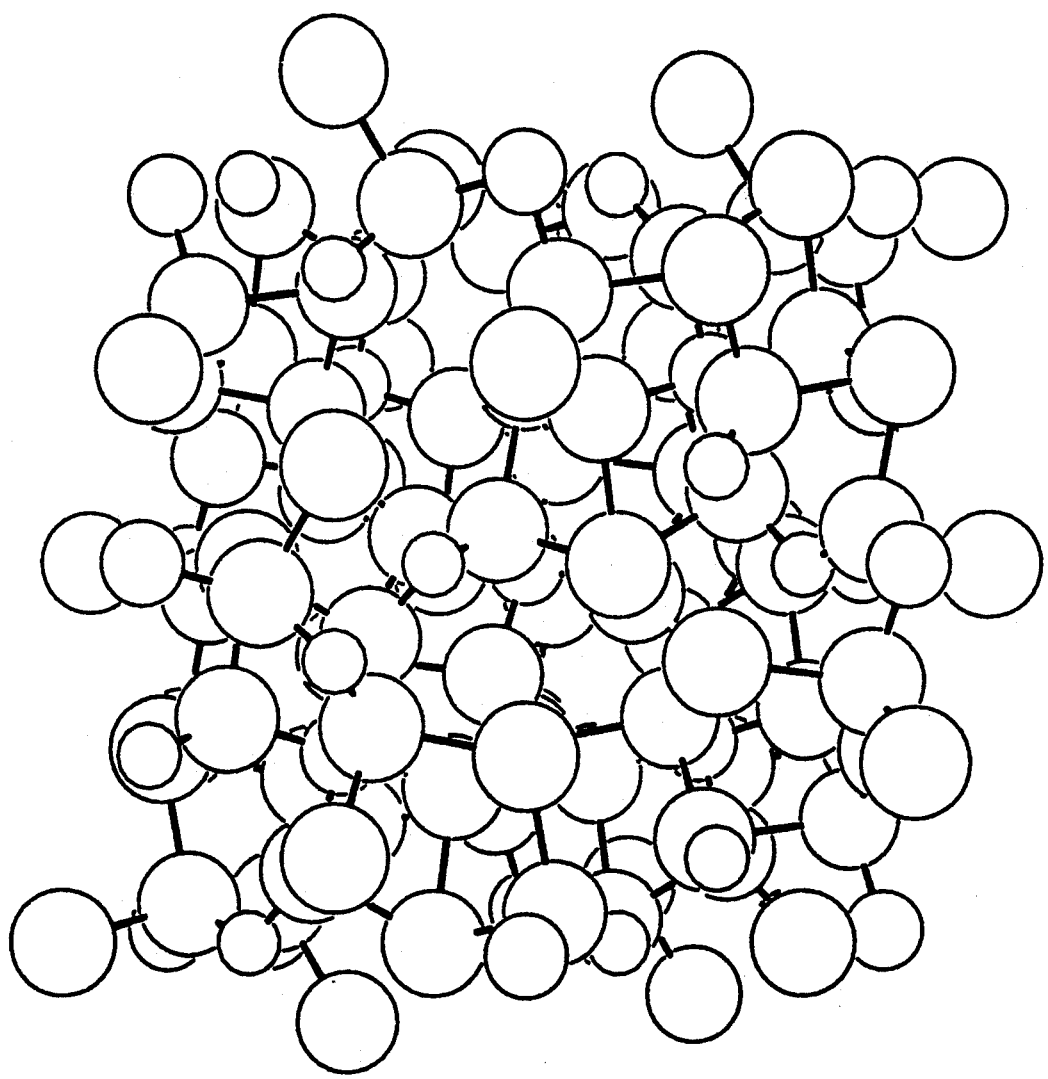
FIG. 5 is a crystal structure plot of Garnet, which is a molecular framework structure utilized in the present invention.
Figure 6:
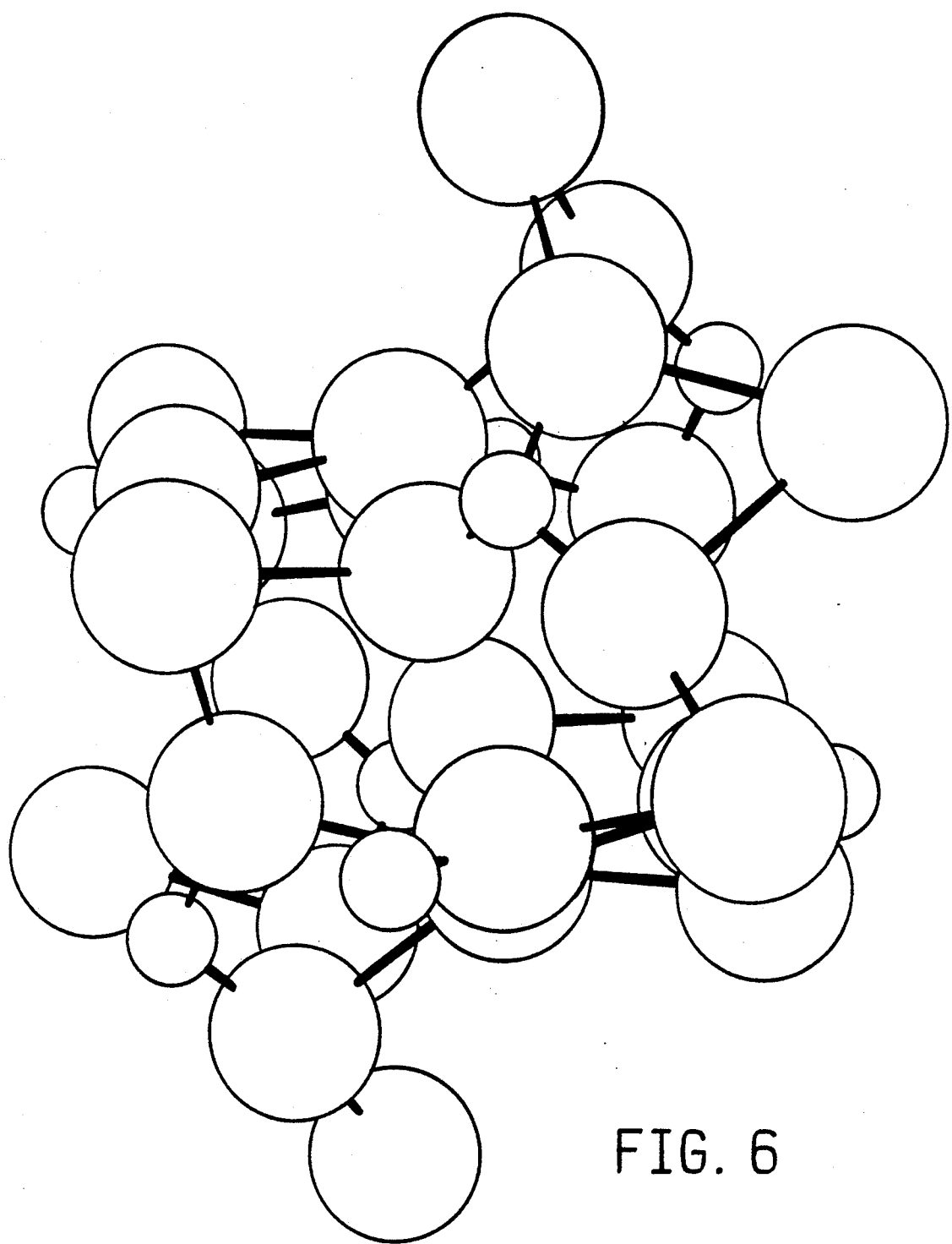
FIG. 6 is a crystal structure plot of LaPO4 (monoclinic), which is a molecular framework structure utilized in the present invention.
Figure 7:
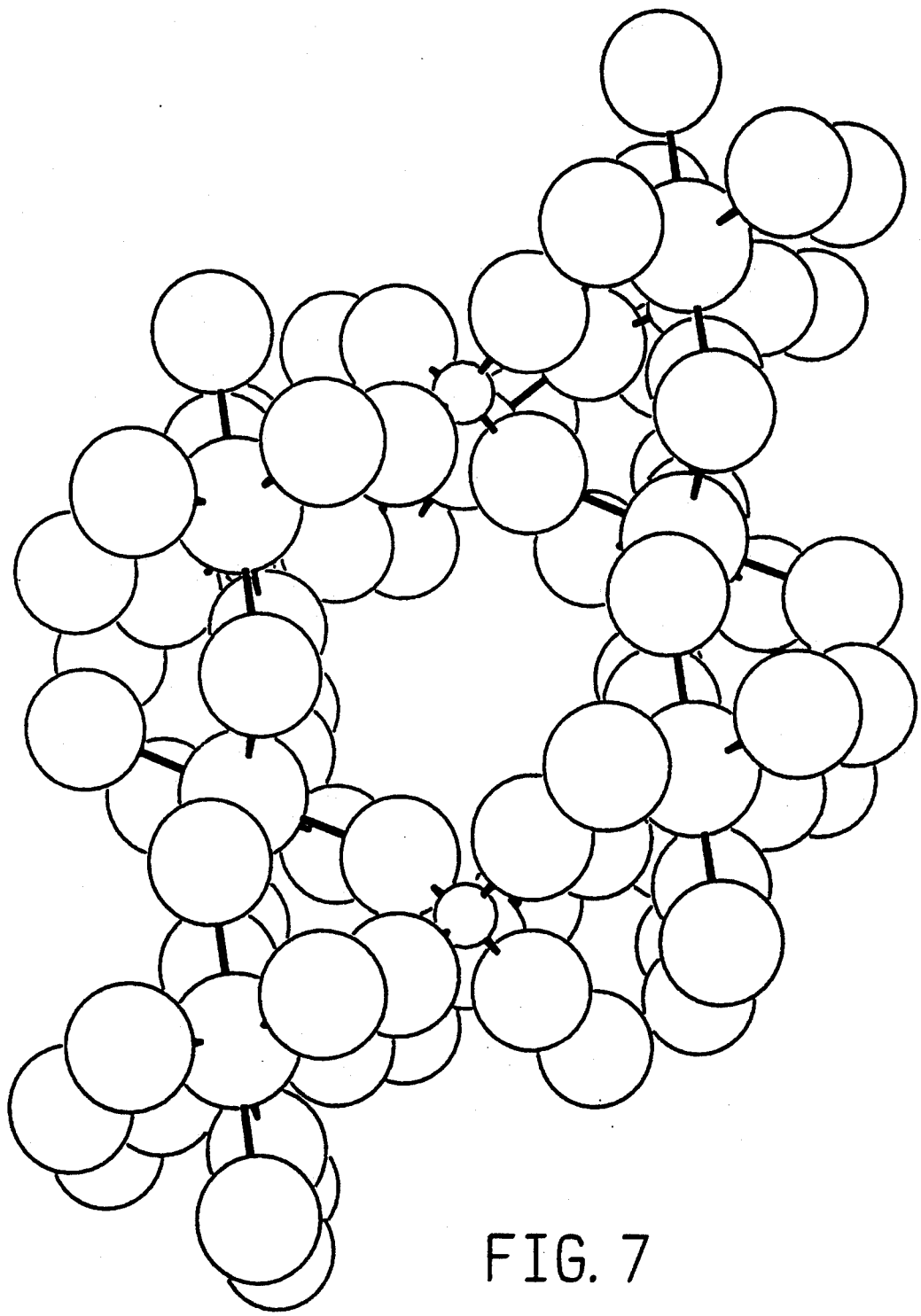
FIG. 7 is a crystal structure plot of LaPO4 (hexagonal), which is a molecular framework structure utilized in the present invention.
Figure 8:
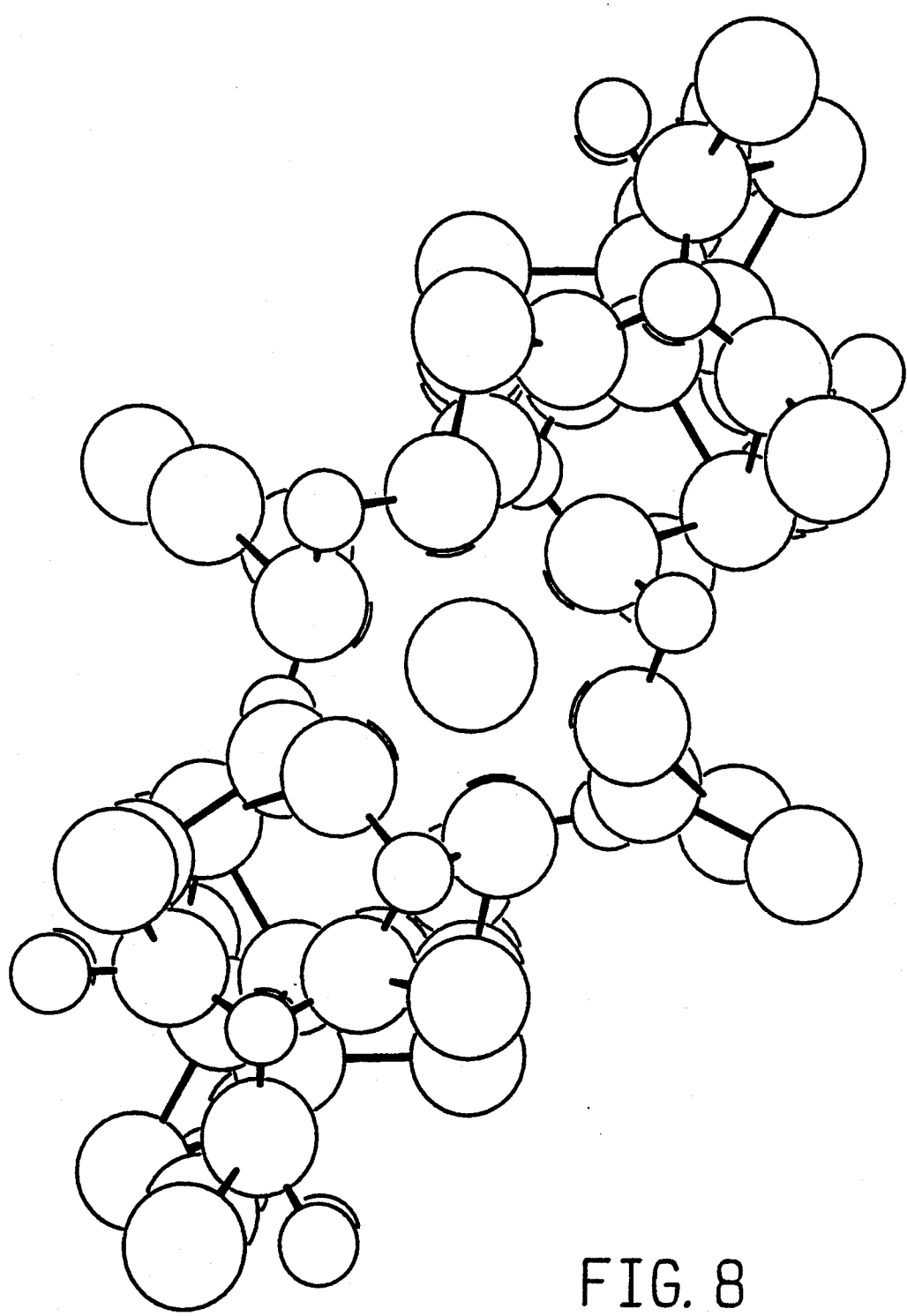
FIG. 8 is a crystal structure plot of Nepheline, which is a molecular framework structure utilized in the present invention.
Figure 9:
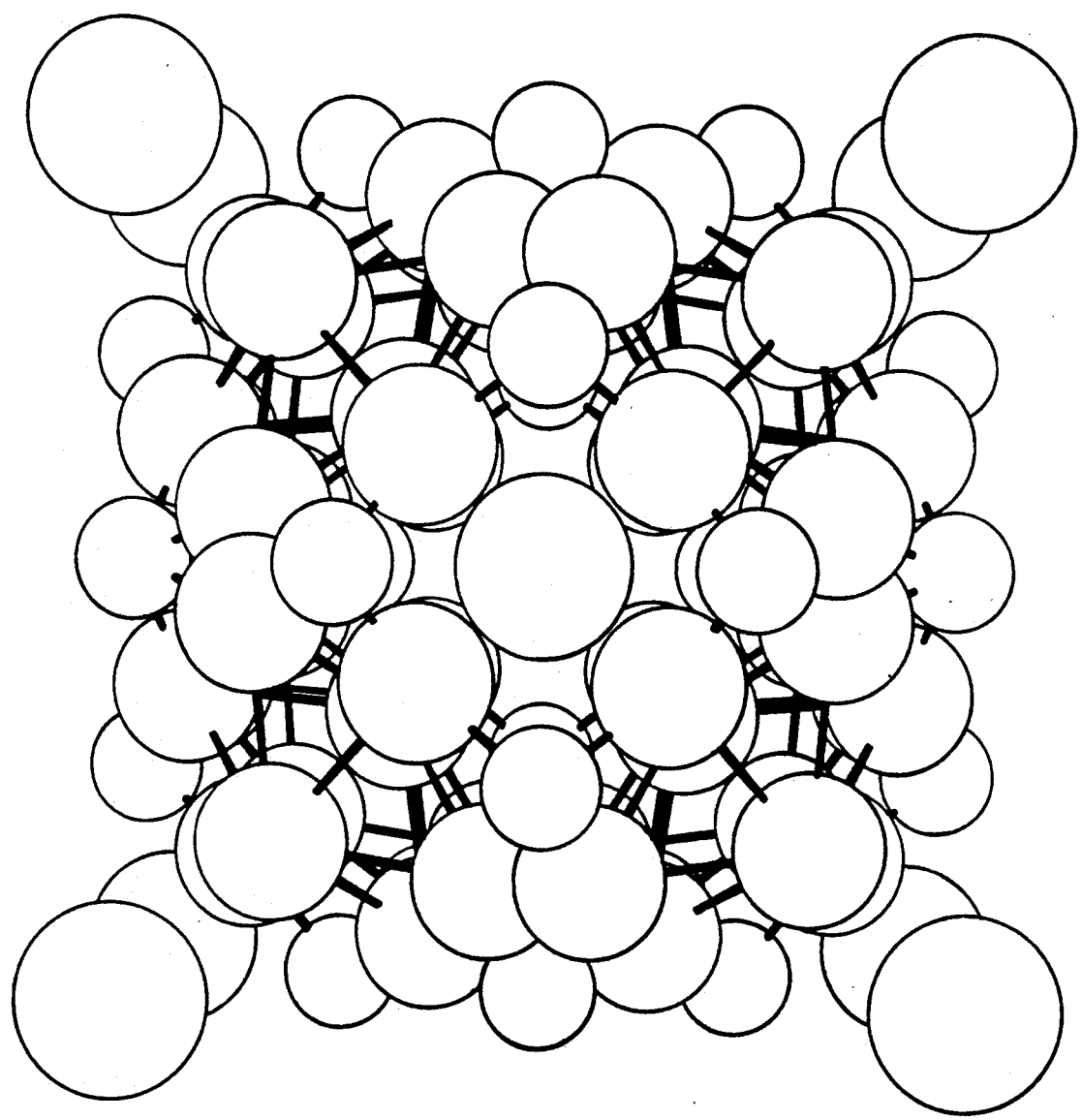
FIG. 9 is a crystal structure plot of Sodalite, which is a molecular framework structure utilized in the present invention.

The new electrolytes of the present invention described herein operate at temperatures ranging from 600°–800° C. to display conductivities higher than presently used solid oxide electrolytes operating at similar temperatures. The invented class of ionic conductors have molecular framework structures featuring channels or planes that are large enough to transport an oxide ion or a hydrated proton through them. When these structures have net positive or net negative charges associated with them, by for example, substituting some atoms on the structures with relatively higher- or lower-valent elements, i.e., doping the material with aliovalent ions, these structures easily accommodate the shuttling of ions through the channels and/or planes.

Conductivity of the partially substituted electrolytes can be measured by ac impedance spectroscopy in either air or in a humidified hydrogen/oxygen cell, the latter serving to mimic fuel cell stack conditions. Also, by measuring the electromotive force between the two electrodes in humidified hydrogen/oxygen and comparing the experimental to the theoretical values, the ionic transference number can be determined as additional assurance that the conductivity occurring is ionic and not electronic as is the case with the "hopping" oxide ion phenomenon found in the prior art. Unity is the theoretical value depicting a one-to-one ion transfer through the electrolyte.

Molecular Framework Material Types

A myriad of materials can be used as molecular framework structures which contain channels or pores in the crystal structure that are large enough to accommodate ions. Structures associated with apatite [$Ca_5F(PO_4)_3$], cordierite ($Mg_2Al_4Si_5O_{18}$), berlinite ($AlPO_4$), cristobalite ($SiO_2$-$AlPO_4$), and tridymite ($SiO_2$-$AlPO_4$) are representative of the framework structures.

A characteristic of framework materials is open channels or planes running parallel to a crystallographic axis that are amenable to rapid ion migration. A crucial element in choosing a molecular framework structure is the "openness" of the channels. Generally, such channels and planes having diameters of about 3 Angstroms (Å) are acceptable. The openness of the channels and planes can be further quantified by counting the number of oxygen atoms in a 1000 cubic Å volume. Table 1 lists the names of exemplary framework structures together with their openness characteristics and with reference to a corresponding FIGURE of the drawing.

TABLE 1

Structural Types and Openness of Electrolyte Materials

| Structural Type | Formula of Parent Mineral | Openness, $O^{2-}$, 1000Å$^3$ | FIG. No. |
|---|---|---|---|
| Anthophyllite | $(HO)_2Mg_7Si_8O_{22}$ | 54.18 | 1 |
| Apatite | $Ca_5F(PO_4)_3$ | 45.87[a] | 2 |
| Berlinite | $AlPO_4$ | | |
| Cordierite | $Mg_2Al_4Si_5O_{18}$ | 46.36 | 3 |
| Cristobalite | ($SiO_2$—$AlPO_4$) | | |
| Dumortierite | $(Al,Fe)_7O_3(BO_3)(SiO_4)_3$ | 64.29 | 4 |
| Garnet | $Ca_3Al_2(SiO_4)_3$ | 57.62 | 5 |
| Framework L (hexagonal) | $LaPO_4$ | 53.88 | 6 |
| Framework L (monoclinic) | $LaPO_4$ | 42.73 | 7 |
| Nepheline | $KNa_3(AlSiO_4)_4$ | 43.66 | 8 |
| Sodalite | $Na_4Al_3Si_3O_{12}Cl$ | 36.76[a] | 9 |
| Tridymite | ($SiO_2$—$AlPO_4$) | | |
| Olivine[b] | $Mg_2SiO_4$ | 54.59 | |
| Hollandite | $BaAl_2TiO_{16}$ | 48.81 | |

[a]Halide ion is included in oxide ion count.
[b]Included for the sake of comparison. Olivine represents a close approximation to cubic close-packing.

The openness listed in Table 1 for the various electrolyte materials is greater than that of $ZrO_2$. Furthermore, most of the materials tested by the inventors and included in Table 1 are more open than the two well-known types of molecular packing, namely hexagonal and cubic close-packing. Cubic close-packing is represented by Olivine in Table 1. The openness desirability is inversely proportional to the openness numbers found in Table 1 so that those compounds which have low numbers in the openness column are more desirable from an ion transport capability standpoint.

$AlPO_4$. An example of a molecular framework having channels to accommodate ion flow-through is aluminum phosphate ($AlPO_4$). $AlPO_4$ is isomorphous with $SiO_2$ and has similar phases and structures as silica. In three of these structures, berlinite, cristobalite and tridymite, there is a central channel of about three Angstroms (Å) in diameter which is large enough to accommodate either an $O^{2-}$ or $H_3O^{30}$ ion. In native $AlPO_4$, the channel is unoccupied and the conductivity of aluminum phosphate is very low. Substituting some of the aluminum or phosphorus with a higher-valent element, such as silicon or titanium, leads to either the formation of interstitial oxide ions or free ions. These same effects would be seen when substituting some of the phosphorous with hexavalent sulfur (as sulfate ion) or heptavalent chlorine (as perchlorate ion). Generally, with such substitutions, a net positive charge is put on the framework. This positive charge can be compensated by oxide ions in the channel.

Similarly, by substituting a lower-valent element, such as magnesium or zinc for the aluminum or silicon for the phosphorus, a net negative charge is created on the framework that can be compensated by the formation of vacancies or by positive ions in the channel. The formation of vacancies is a manifestation of the principle of le Chatelier wherein the equivalent of oxide ions leave the lattice structure of the oxide molecule to balance any negative charge resulting from substitution by lower-valance cations.

Some of the substituted aluminum phosphates that were used for testing were first made by dissolving aluminum nitrate, the substitute metal nitrate, and ammonium phosphate in water and then precipitating the aluminum phosphate at a controlled pH of 5 to 7. The precipitate was then washed, dried and calcined. Finally, the resulting powder was pressed into pellets that were sintered to better than 90% density at temperatures of 900°-1600° C.

Sulfate ion was incorporated into $AlPO_4$ by dissolving stoichiometric amounts of aluminum nitrate, aluminum sulfate and monobasic ammonium phosphate in water, drying and calcining at 800° C. overnight. A similar procedure was used to incorporate perchlorate ion.

Some of the $AlPO_4$ compositions produced are listed in Table 2 below in isoelectronic formalism. This formalism is based on an analogy of $AlPO_4$ with $SiO_2$. In illustrating the isoelectronic formalism, $SiO_2$ is rewritten as $[SiO_2][SiO_2]$. Replacing the first $Si^{4+}$ with a lower-valent $Al^{3+}$ and keeping the total oxygen content constant would necessitate a negative charge on the fragment to maintain charge balance. This intermediate species is represented as $[AlO_2]^-[SiO_2]$. Analogously, replacing the remaining $Si^{4+}$ atom with $P^{5+}$ would produce a fragment with a positive charge on it and would yield $[AlO_2]^-[PO_2]^+$ for $AlPO_4$.

TABLE 2

| Doped AlPO$_4$ Compositions[1] |
|---|
| $[AlO_2]^-{}_{0.84}[SiO_2]_{1.68}[PO_2]_{2.52}[O_i'']_{0.84}$ |
| $[AlO_2]^-{}_{0.84}[MgO_2]^{2-}{}_{0.16}[PO_2]^+{}_{0.84}[ClO_2]^{3+}{}_{0.32}[O_i'']_{0.32}$ |
| $[AlO_2]^-[PO_2]^+{}_{0.84}[ClO_2]^{3+}{}_{0.48}[O_i'']_{0.64}$ |
| $[AlO_2]^-[PO_2]^+{}_{0.84}[SO_2]^{2+}{}_{0.24}[O_i'']_{0.16}$ |

[1]$O_i''$ represents interstitial oxide ion.

In accordance with a feature of the present invention, $AlPO_4$ doped with silicon on the aluminum site and sulfur on the phosphorus site has conductivities that are several orders of magnitude higher than those of native $AlPO_4$. Separately, $AlPO_4$ that was doped with 12 Mg mole percent exhibited conductivities as high as $3 \times 10^{-2}$ ohm$^{-1}$cm$^{-1}$.

Cordierite. These compounds have a general formula $(Mg,Fe)_2Al_4Si_5O_{18}$. Three aluminum atoms are in six-coordination and the fourth substitutes for one Si in a ring structure. Together, they produce an $AlSi_5O_{18}$ group. There are channels within the ring structure in which water and other ions could be accommodated. Two compounds containing interstitial oxygen ions were synthesized, and are represented by the following formulae:

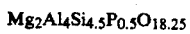

and

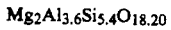

The cordierite compounds were made by reacting stoichiometric amounts of the respective oxides and monobasic ammonium phosphate at 863° C. for 10 hours. Pellets of the compounds were pressed and then sintered at 1200° C. for 18 hours.

Aluminosilicophosphates. Aluminosilicophosphates represent another framework material type that may contain interstitial oxide ions. A formula for this type of compound is $AlSi_2P_3O_{13}$. It is hexagonal in structure. This compound was made by solgel processing whereby 0.1 moles of aluminum nitrate and 0.1 moles of monobasic ammonium phosphate were dissolved in a minimum amount of water (approximately 0.8 moles). 0.2 moles of tetraethoxysilane was then added to the mixture, along with a minimum amount of ethanol to make the mixture homogeneous. The reaction mixture was gently heated to make it a gel. The gel was dried at 130° C. and ground into a paste with 0.1 moles of $P_2O_5$ in methylenechloride as the grinding medium. The dried paste was then calcined at 1000° C. for six days. X-ray diffraction analysis indicated that the calcined material contained about 80% of the desired compound.

Impedance measurements on this compound were conducted in a humidified $H_2/O_2$ cell, so as to mimic actual use conditions, and also as direct current measurements can yield inaccurate conductance values due to electrical polarization. Measurements in $H_2/O_2$ yielded a value of $10^{-6}$ ohm$^{-1}$cm$^{-1}$ for conductivity and 0.4 as the ionic transference number.

Apatites. Given the general structural apatite formula of $[Ca_5F(PO_4)_3]$, solid solution apatite structures containing lone oxygen atoms have been produced depicted by the general formula $Sr_{5.5}La_{4.5}(PO_4)_{1.5}(SiO_4)_{4.5}O$. The lone oxygen atom sits in a central channel along the crystallographic c-axis, free to migrate. The conductivity and ionic transference numbers for this material were measured in a humidified $H_2/O_2$ cell (water on both sides), and the results are depicted in Table 3, below:

TABLE 3

| Conductivity and Ionic Transference Data from $Sr_{5.5}La_{4.5}(PO_4)_{1.5}(SiO_4)_{4.5}O$. | | |
|---|---|---|
| Temperature °C. | Conductivity ohm$^{-1}$cm$^{-1}$ | Transference Number |
| 810 | $2.08 \times 10^{-8}$ | 0.84 |
| 706 | $2.27 \times 10^{-7}$ | 0.83 |
| 609 | $7.58 \times 10^{-9}$ | 0.67 |

Another strontium-containing apatite, having the formula $Sr_5(OH)(PO_4)_3$, yielded even higher conductivity values. These values are listed in Table 4, below:

TABLE 4

| Conductivity data from $Sr_5(OH)(PO_4)_3$ | | |
|---|---|---|
| Temperature °C. | Conductivity ohm$^{-1}$cm$^{-1}$ | Tranference Number |
| 495 | $9.26 \times 10^{-6}$ | 0.32 |
| 578 | $2.78 \times 10^{-5}$ | 0.42 |
| 685 | $7.52 \times 10^{-5}$ | 0.47 |
| 781 | $2.58 \times 10^{-4}$ | 0.59 |

Framework L. Framework L has the following, generalized, nonsubstituted formula $LaPO_4$. When framework L is doped with 10% Bi, it retains its hexagonal-to-monoclinic transition at low temperatures, with the relatively higher-valent Bismuth introducing vacancies into the lattice. These materials exhibited conductivities of $1 \times 10^{-3}$ ohm$^{-1}$cm$^{-1}$ and an ionic transference number of 0.96 at 800° C. in an $H_2$/air cell.

Another way to stabilize the hexagonal form of framework L is to use a template around which L can crystallize. The simplest template for this use may be an oxide ion. As such, a pellet of L containing 5% excess L-metal was made. The conductivity and ionic transference data of this pellet was measured in a humidified, oxygen-gradient cell, and is depicted in Table 5.

TABLE 5

Conductivity and Ionic Transference Data for 5%-excess L-metal[1] in Framework L

| Temperature °C. | Conductivity ohm$^{-1}$cm$^{-1}$ | Transference Number |
|---|---|---|
| 510 | 7.33 × 10$^{-6}$ | 0.17 |
| 609 | 1.68 × 10$^{-5}$ | 0.57 |
| 713 | 4.12 × 10$^{-5}$ | 0.58 |
| 814 | 8.39 × 10$^{-5}$ | 0.72 |

[1]This material was found to be monoclinic by x-ray diffraction analysis.

In summary, the invented ionic conductors described in the foregoing detailed description can be used as electrolytes in solid oxide fuel cells, sensors or batteries at temperatures ranging from 600° C. to 800° C. For example, the exemplary molecular framework structure compounds represented by substituted aluminum phosphates can be used as proton or oxide ion conductors. Substituted aluminum phosphates can also be used as sodium or lithium conductors in batteries. Such substituted aluminum phosphates include the material commonly known as NASICON, which has the following general formula:

$$A_{1+x}D_{2-x/3}Si_xP_{3-x}O_{12-2x/3}$$

wherein A is an alkali metal, and D is a quadrivalent ion of group IV of the periodic table. A more complete description of NASICON can be found in U.S. Pat. No. 4,465,744, which is incorporated herein by reference.

While the invention has been described with reference to details of the illustrated embodiments, these details are not intended to limit the scope of the invention as defined in the appended claims.

The embodiment of the invention in which an exclusive property or privilege is claimed is defined as follows:

1. An ionic conductor of oxide ions or hydrated protons comprising:
   a) molecular framework structure having a net positive charge or a net negative charge or oxide-ion vacancies; and
   b) said molecular framework structure having channels large enough to transport said oxide ions or hydrated protons;
wherein the molecular framework structure is selected from the group consisting of substituted aluminum phosphates, substituted orthosilicates, substituted silicoaluminates, substituted apatites having the general formula Ca$_5$F(PO$_4$)$_3$, substituted sodalites having the general formula Na$_4$Al$_3$Si$_3$O$_{12}$Cl, and combinations thereof.

2. An ionic conductor as recited in claim 1 wherein the channels in the molecular framework structure are about 3Å in diameter or greater.

3. An ionic conductor as recited in claim 1 wherein the aluminum phosphates are selected from the group consisting of berlinites, tridymites, cristobalites, and combinations thereof.

4. An ionic conductor as recited in claim 1 wherein the orthosilicates are selected from the group consisting of:
   Anthophyllite having the formula (HO)$_2$Mg$_7$Si$_8$O$_{22}$;
   Dumortierite having the formula (Al,Fe)$_7$O$_3$(BO$_3$)(SiO$_4$)$_3$;
   Olivine having the formula Mg$_2$SiO$_4$; and
   Framework L having the general formula LaPO$_4$.

5. An ionic conductor as recited in claim 1 wherein the silicoaluminates are selected from the group consisting of:
   Nepheline having the formula KNa$_3$(AlSiO$_4$)$_4$;
   Garnet having the formula Ca$_3$Al$_2$(SiO$_4$)$_3$;
   Cordierite having the formula Mg$_2$Al$_4$Si$_5$O$_{18}$; and
   Sodalite having the formula Na$_4$Al$_3$Si$_3$O$_{12}$Cl.

6. An ionic conductor as recited in claim 1 wherein the net positive charge on the molecular framework structure is provided by substituting some of the atoms of the molecular framework structure with relatively higher-valent elements.

7. An ionic conductor as recited in claim 6 wherein the higher-valent elements are selected from the group consisting of silicon, titanium, sulfur, chlorine, and combinations thereof.

8. An ionic conductor as recited in claim 1 wherein the net positive charge on said molecular framework structure is provided by substituting some of the aluminum of an aluminum phosphate of the molecular framework structure with a relatively higher-valent element selected from the group consisting of silicon, titanium and combinations thereof.

9. An ionic conductor as recited in claim 1 wherein the net positive charge on said molecular framework structure is provided by substituting some of the phosphorus of an aluminum phosphate molecular framework structure with a higher-valent element selected from the group consisting of aluminum, silicon and combinations thereof.

10. An ionic conductor as recited in claim 1 wherein the net negative charge on the molecular framework structure is provided by substituting some of the atoms of the molecular framework structure with relatively lower-valent elements.

11. An ionic conductor as recited in claim 10 wherein the lower-valent elements are selected from the group consisting of magnesium, zinc, silicon or combinations thereof.

12. An ionic conductor as recited in claim 1 wherein the net negative charge on said molecular framework structure is provided by substituting some of the aluminum of an aluminum phosphate molecular framework structure with a lower-valent element selected from the group consisting of magnesium, zinc, and combinations thereof.

13. An ionic conductor as recited in claim 1 wherein the net negative charge on said molecular framework structure is provided by substituting some of the phosphorus of an aluminum phosphate molecular framework structure with silicon.

14. An ionic conductor as recited in claim 1 wherein the ionic conductor is used as an electrolyte in fuel cells, sensors, or batteries.

15. An ionic conductor as recited in claim 1 wherein the substituted aluminum phosphates are used as a proton, vacancy or oxide ion conductor.

16. An electrolyte for an electrochemical fuel cell comprising:

a molecular framework structure having a net positive charge or a net negative charge;

said molecular framework structure having channels large enough to transport oxide ions or hydrated protons;

said molecular framework structure being thermodynamically stable at fuel cell operating temperatures of less than 800° C; and said molecular framework structure is selected from the group consisting of substituted aluminum phosphates, substituted orthosilicates, substituted silicoaluminates, substituted apatites having the general formula $Ca_5F(PO_4)_3$, substituted sodalites having the general formula $Na_4Al_3Si_3O_{12}Cl$, cancrinites, cordierites and combinations thereof.

17. An electrolyte as recited in claim 16 wherein the net positive charge or net negative charge on the molecular framework structure is provided by substituting some of the atoms of the molecular framework structure with relatively higher-valent or lower-valent elements.

18. A fuel cell having an anode and a cathode separated by a solid, ionic conductor of oxide ions or hydrated protons, said solid ionic conductor comprising a molecular framework structure having a net positive charge, a net negative charge or oxide ion vacancies; said molecular framework structure having channels large enough to transport said oxide ions or hydrated protons, wherein said molecular framework structure is selected from the group consisting of substituted aluminum phosphates, substituted orthosilicates, substituted silicoaluminates, substituted apatites having the general formula $Ca_5F(PO_4)_3$, substituted sodalites having the general formula $Na_4Al_3Si_3O_{12}Cl$, and combinations thereof.

* * * * *